(12) United States Patent
Rho

(10) Patent No.: US 6,957,787 B1
(45) Date of Patent: Oct. 25, 2005

(54) CENTRIFUGAL BRAKING DEVICE FOR BAIT CASTING REEL

(76) Inventor: Yeon Seok Rho, Mok-Dong Bless-Ville 507-Ho,340,Sinjeong 2(i)-Dong, Yang Cheon-Gu, Seoul (KR)

(*) Notice: Subject to any disclaimer, the term of this patent is extended or adjusted under 35 U.S.C. 154(b) by 0 days.

(21) Appl. No.: 10/971,810

(22) Filed: Oct. 22, 2004

(30) Foreign Application Priority Data

Aug. 13, 2004 (KR) ...................... 10-2004-0063956

(51) Int. Cl.$^7$ ............................................ A01K 89/02
(52) U.S. Cl. .................................. 242/289; 188/181 A
(58) Field of Search ...................... 242/289; 188/181 A

(56) References Cited

U.S. PATENT DOCUMENTS

| | | | |
|---|---|---|---|
| 3,994,160 A | * 11/1976 | Hanson | .................. 73/116 |
| 5,542,619 A | * 8/1996 | Karlsson | ................. 242/289 |
| 5,865,387 A | * 2/1999 | Hirano | .................. 242/289 |
| 5,996,921 A | * 12/1999 | Hogaki et al. | .............. 242/289 |

FOREIGN PATENT DOCUMENTS

| | | |
|---|---|---|
| JP | 02-011885 | 1/1990 |
| JP | 2003-125679 | 5/2003 |

* cited by examiner

*Primary Examiner*—Emmanuel Marcelo
(74) *Attorney, Agent, or Firm*—Brooks Kushman P.C.

(57) ABSTRACT

A centrifugal braking device for a bait casting reel. A spool has a spool shaft which is rotatably coupled to a reel body. A brake housing is coupled to one end of the spool shaft to be rotated integrally with the spool and has sliding grooves. Brake elements are slidably received in the sliding grooves to be rotated integrally with the spool. A brake drum can be brought into frictional contact with the brake shoes to selectively limit rotation of the brake housing to some extent. The brake elements are positioned differently from one another by a predetermined angle along a circumferential direction and slidably received in the sliding grooves, respectively. A frictional force between outer end surfaces of the brake elements and an inner surface of the brake drum is selectively increased or decreased depending upon a rotation direction of the brake elements.

5 Claims, 6 Drawing Sheets

CENTRIFUGAL BRAKING DEVICE FOR BAIT CASTING REEL

BACKGROUND OF THE INVENTION

1. Field of the Invention

The present invention relates to a centrifugal braking device for a bait casting reel in which a frictional force induced between ends of brake elements and a brake drum can be selectively increased or decreased depending upon a rotating direction of the brake elements, in a manner such that a rotation-resistant force is controllably generated in response to a casting force when casting bait and no resistant force is generated in response to a winding force when winding a fishline.

2. Background Art

Referring to FIG. 1, a bait casting reel includes a reel body 10 capable of paying out and winding a fishline L, and a handle 11 for allowing a fishline winding operation to be easily conducted.

The reel body has a frame. In the frame, there are provided a spool 20 from or on which the fishline L is paid out or wound, a spool driving mechanism for rotating the spool 20, a drag mechanism 13 for preventing unintentional release of the fishline L, and a level wind mechanism 15 for evenly distributing the fishline L on the spool 20. The handle 11 is connected to the spool driving mechanism and disposed outside the reel body 11.

The bait casting reel is constructed to cast bait of varying weight, which is put on a fishhook fixed to a distal end of the fishline L, to a desired place. In the bait casting reel, a cast depends upon the expertise of a user. If the spool 20 which is rotated at a high speed is not properly braked during casting, since the spool 20 rotates faster than the fishline L is drawn from the spool 20, the fishline L is continuously paid out from the spool 20 due to inertia of the rotating spool 20 even though a casting operation is completed, as a result of which the fishline L is likely to become entangled around the spool 20 between the spool 20 and the reel body 10.

Concretely speaking, as the fishline L is paid out by casting, the spool 20 is rotated at a high speed. Due to this fact, an inertia force is generated by the rotation of the spool 20 to continuously pay out the fishline L. Therefore, from the time the bait and hook which have been cast start to freely fall, the already paid-out portion of fishline L is likely to become entangled around the spool 20 between the spool 20 and the reel body 10.

Therefore, in order to prevent the fishline L from being entangled, it is necessary to decrease a rotational speed of the spool 20 by lightly pressing the thumb against the rotating spool 20.

Nevertheless, in the conventional bait casting reel, after the spool 20 is rotated due to a force induced by a weight connected to the fishline L, a rotation force for rotating the spool changes finely depending upon an inertia force of the spool 20 which is generated depending on the cast, so even for an expert fisherman, it is difficult to properly perceive a manual braking time. For this reason, backlash may result to cause fishline trouble.

SUMMARY OF THE INVENTION

Accordingly, the present invention has been made keeping in mind the above problems occurring in the prior art, and an object of the present invention is to provide a centrifugal braking device for a bait casting reel, wherein a plurality of brake shoes are slidably received in a brake housing integrally coupled to a spool on which a fishline is wound, in such a way as to be independently moved between an extended position and a retracted position, so that a frictional force between outer ends of the brake shoes and an inner surface of a brake drum can be selectively increased or decreased depending upon a rotating direction of the brake shoes, whereby a rotation-resistant force is controllably generated in response to a casting force when casting bait and no resistant force is generated in response to a winding force when winding the fishline.

In order to achieve the above object, according to the present invention, there is provided a centrifugal braking device for a bait casting reel, comprising: a spool having a spool shaft which is rotatably coupled to a reel body; a brake housing coupled to one end of the spool shaft to be rotated integrally with the spool and having a plurality of sliding grooves each of which extends radially; a plurality of brake shoes slidably received in the sliding grooves of the brake housing, to be rotated integrally with the spool; a brake drum capable of being brought into frictional contact with the brake shoes to selectively limit to some extent rotation of the brake housing due to a centrifugal force generated by rotation of the break elements; and a cover coupled to the reel body to close one side of the reel body; wherein the brake shoes are positioned differently from one another by a predetermined angle along a circumferential direction about a center of the brake housing and slidably received in the sliding grooves each of which extends radially, wherein a guide plate is coupled to the brake housing, and wherein a frictional force between outer end surfaces of the brake shoes and an inner surface of the brake drum is selectively increased or decreased depending upon a rotating direction of the break elements.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE PREFERRED EMBODIMENTS

Figure 1:
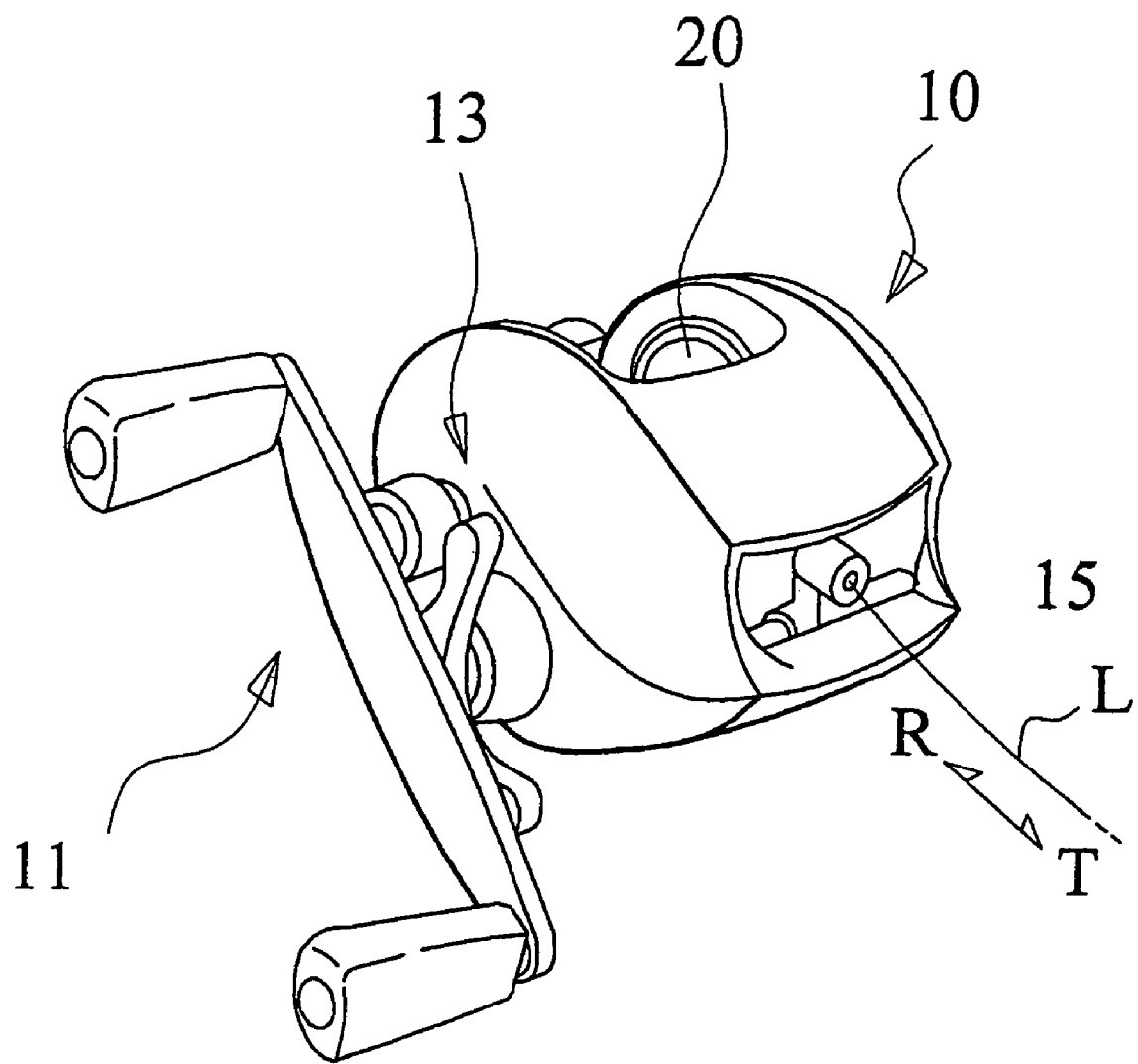
FIG. 1 is a perspective view illustrating an outer appearance of a conventional bait casting reel.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
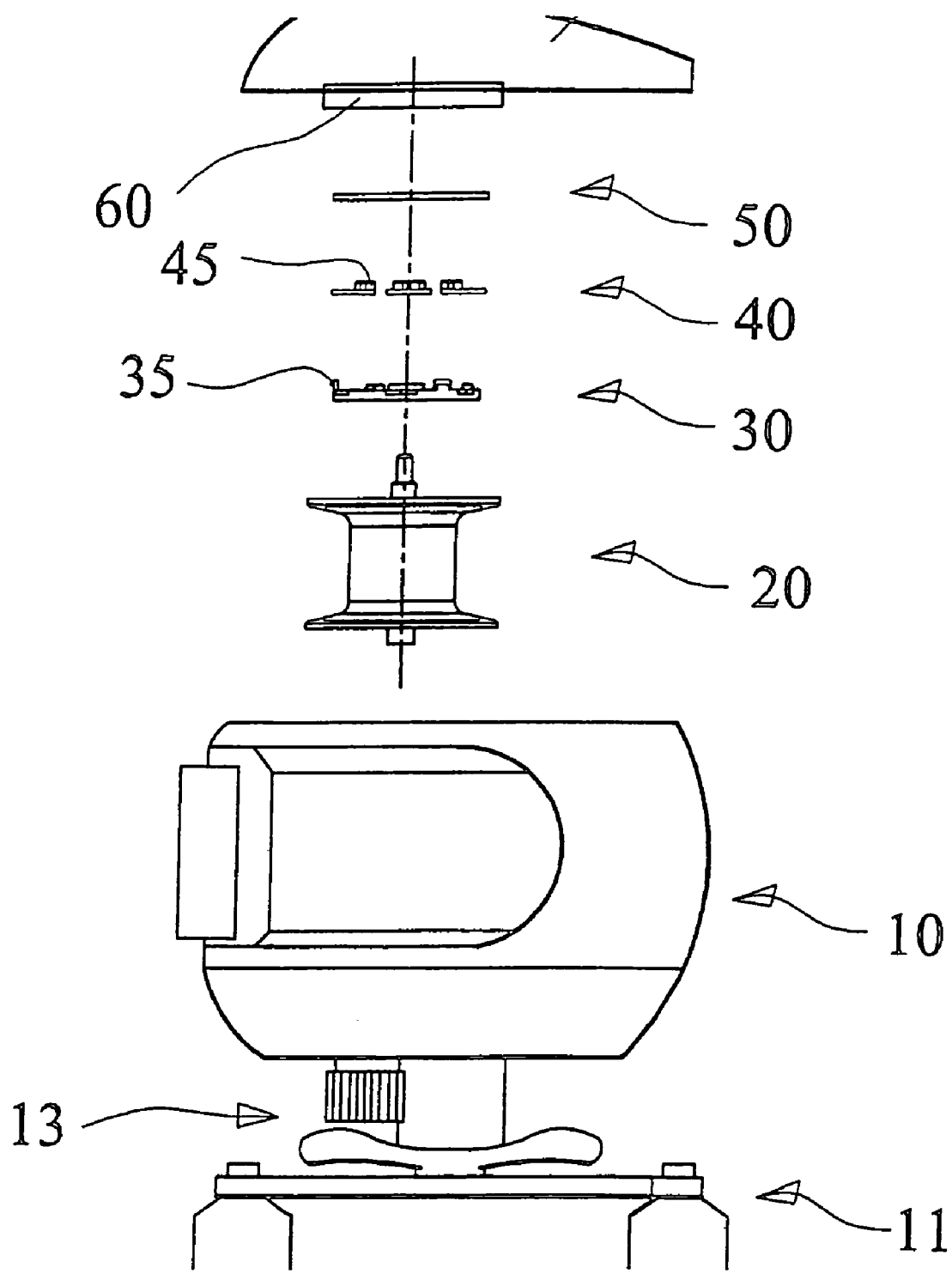
FIG. 2 is an exploded front view illustrating a centrifugal braking device for a bait casting reel in accordance with an embodiment of the present invention.
Figure 3:
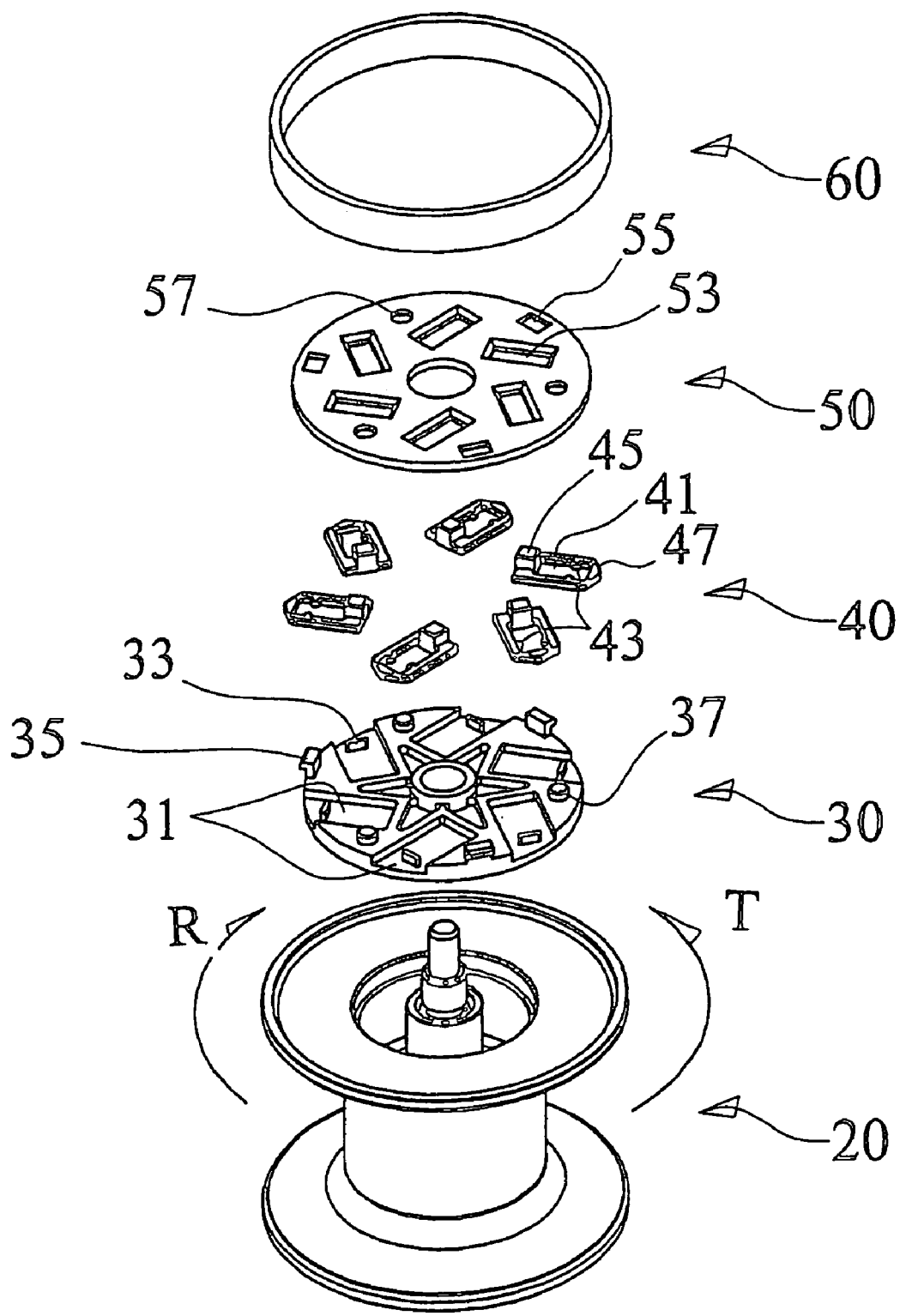
FIG. 3 is a perspective view illustrating component elements of the centrifugal braking device according to the present invention.

FIG. 2 is an exploded front view illustrating a centrifugal braking device for a bait casting reel in accordance with an embodiment of the present invention.

As shown in FIG. 2, the centrifugal braking device for a bait casting reel according to the present invention includes a spool 20. The spool 20 has a spool shaft at a center portion thereof, which is rotatably installed in a reel body 10.

A brake housing 30 is concentrically coupled to one end of the spool shaft of the spool 20 to be rotated integrally with the spool 20. The brake housing 30 has a plurality of sliding grooves 31 each of which extends radially.

A plurality of brake shoes 40 are slidably received in the sliding grooves 31 of the brake housing 30, to be rotated integrally with the spool 20. The brake elements 40 slide in the sliding grooves 31 due to a centrifugal force generated as the brake elements 40 are rotated integrally with the spool 20.

The brake housing 30 and the brake elements 40 are held in a brake drum 60. The brake drum 60 can be brought into frictional contact with the brake elements 40 to selectively limit to some extent rotation of the brake housing 30 using a centrifugal force generated as the spool 20 is rotated.

A cover 19 is coupled to a side of the reel body 10 by coupling means well known in the art, to close an opening which is defined at the side of the reel body 10 to allow the spool 20 to be inserted into and removed from the reel body 10.

The brake elements 40 are positioned differently from one another by a predetermined angle along a circumferential direction about a center of the brake housing 30 and slidably received in the sliding grooves 31 each of which extends radially.

Locking projections 35 and jig projections 37 are alternately formed on an upper surface of the brake housing 30 in a circumferential direction, with each sliding groove 31 defined between the locking projection 35 and jig projection 37. A guide plate 50 is coupled to the brake housing 30 to be placed on the brake housing 30. The guide plate 50 is provided with engagement holes 55 and jig holes 57, so that the locking projections 35 and the jig projections 37 can upwardly project through the engagement holes 55 and the jig holes 57, respectively.

The degree to which outer ends of the brake elements 40 received in the sliding grooves 31 are brought into frictional contact with an inner surface of the brake drum 60 can be controlled by the centrifugal force generated due to rotation of the spool 20, depending upon a rotating direction of the spool 20.

A protruding flange portion 33 is formed on a bottom surface of each sliding groove 31 adjacent to an outer end of each sliding groove 31. A pair of engagement protrusions 43 are formed on a pair of inner edges of each brake element 40 adjacent to the outer end of the brake element 40, which inner edges face each other and cooperate with another pair of inner edges of the brake element 40 to define a rectangular opening 41 through the brake element 40. The flange portion 33 can be engaged with or disengaged from the pair of engagement protrusions 43 to selectively limit rotation of the brake element 40 to some extent.

A plurality of perforations 53 are defined in the guide plate 50, in a manner such that a projecting knob portion 45 which is formed at an inner end of each brake element 40 can upwardly project through each perforation 53 to be capable of being moved radially inward or outward along the sliding groove 31 of the brake housing 30.

The outer end surface 47 of the brake element 40 is inclined at a predetermined inclination angle to maximize the contact area between the outer end surface 47 of the brake element 40 and the inner surface of the brake drum 60.

Figure 4:
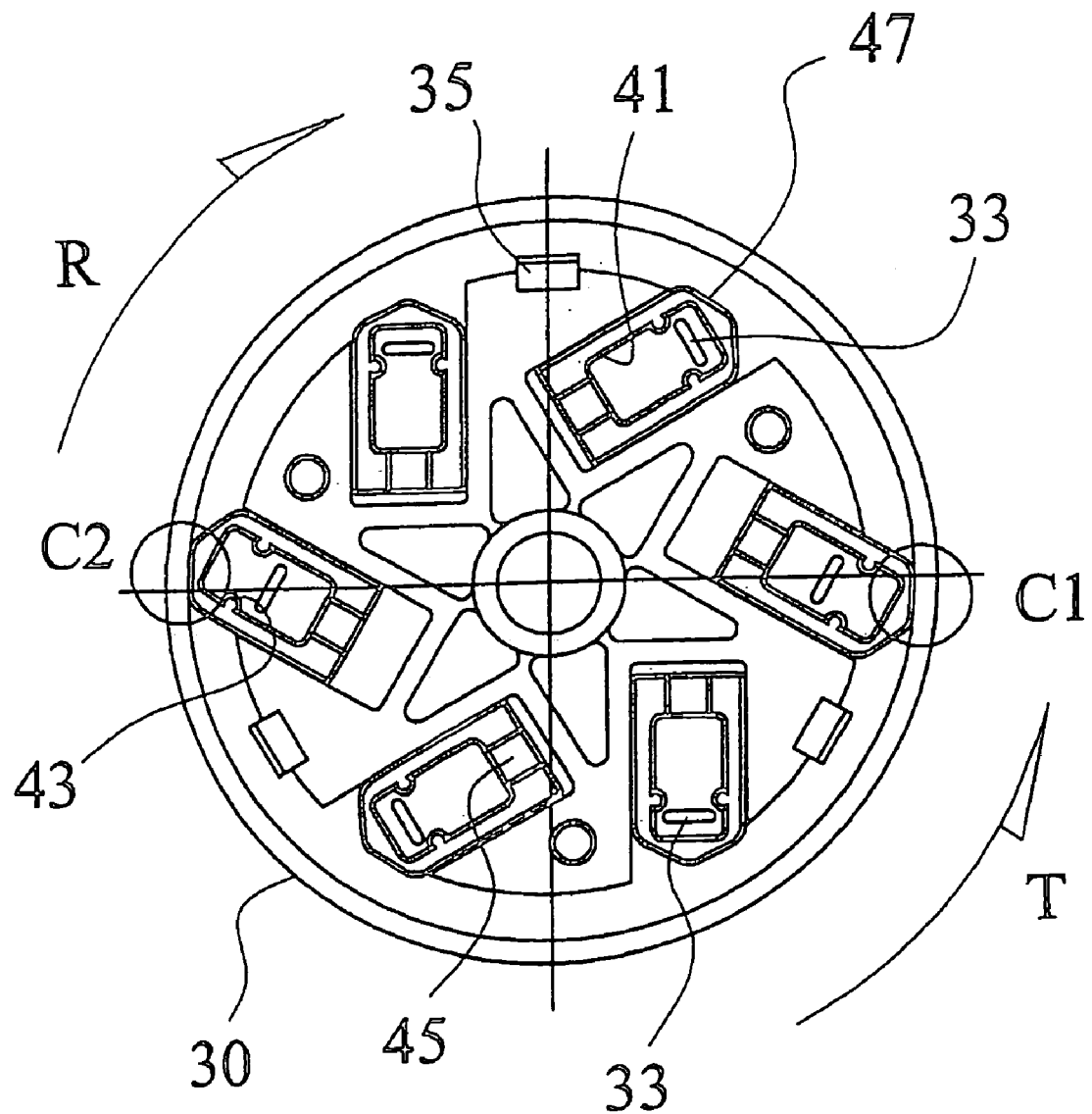
FIG. 4 is a plan view illustrating two contact regions between brake elements and a brake drum in the centrifugal braking device according to the present invention.
Figure 5:
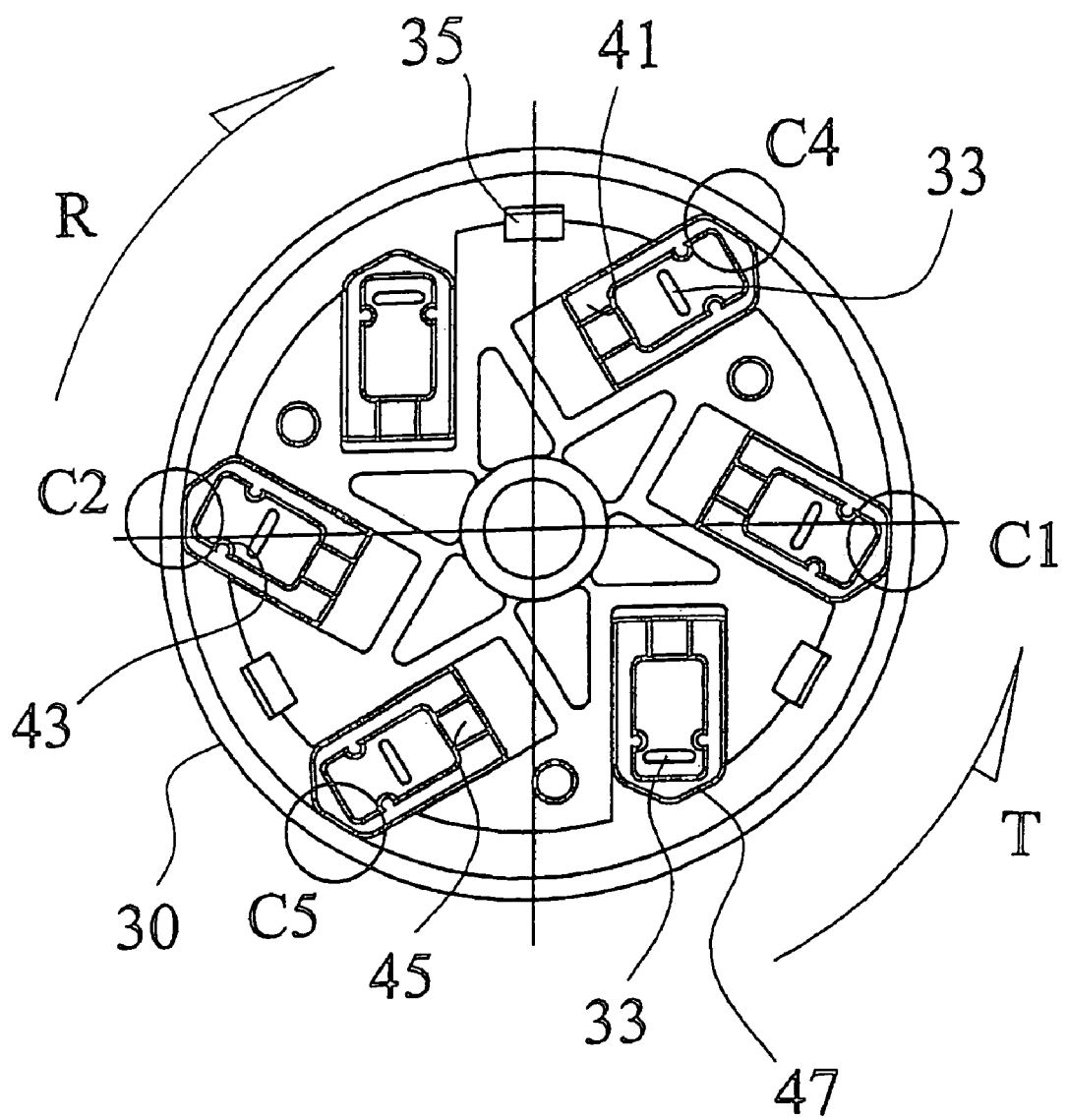
FIG. 5 is a plan view illustrating four contact regions between brake elements and the brake drum in the centrifugal braking device according to the present invention.
Figure 6:
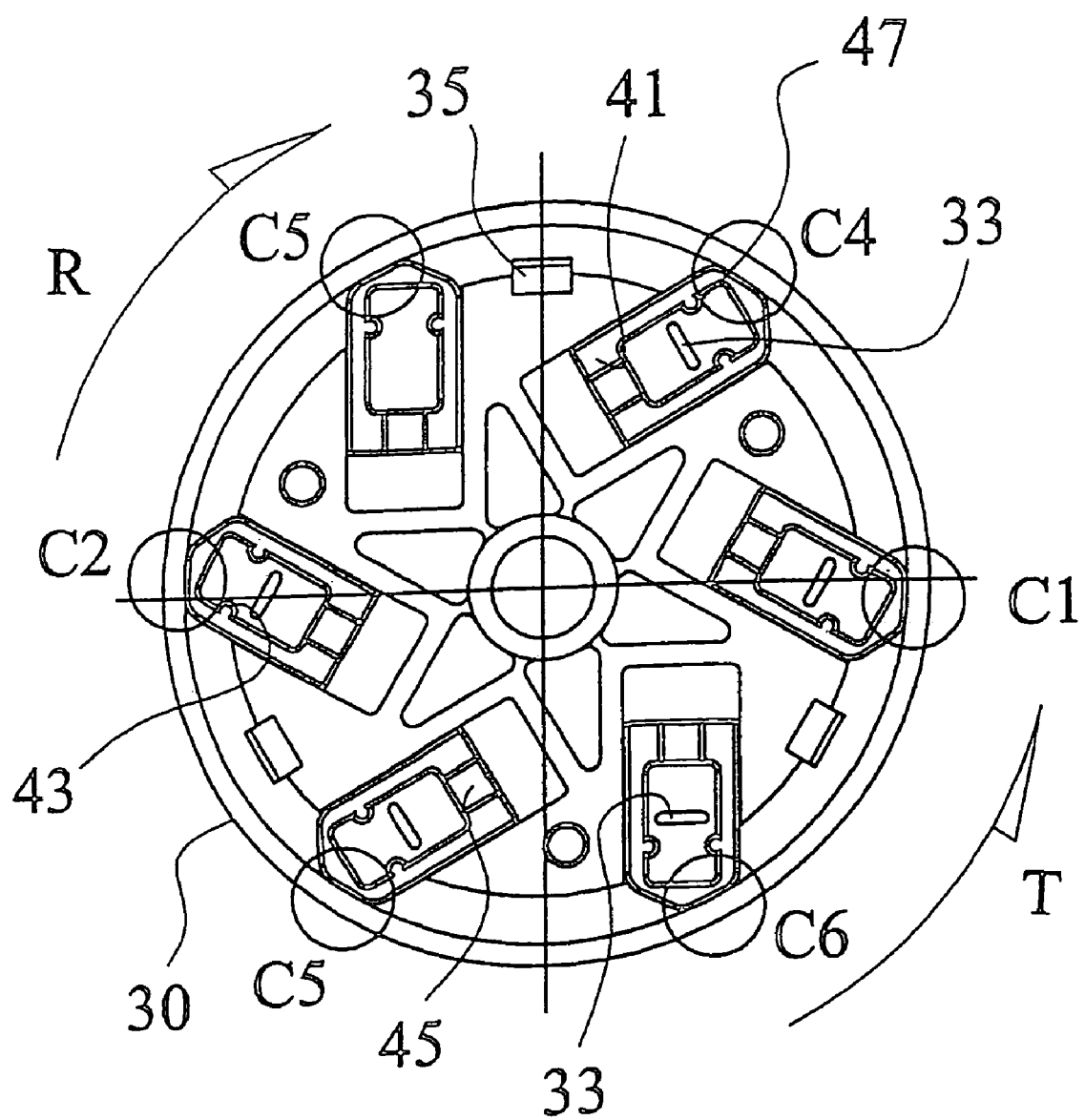
FIG. 6 is a plan view illustrating six contact regions between brake elements and the brake drum in the centrifugal braking device according to the present invention.

Due to the different positioning of the brake shoes 40, when implementing a fishline winding operation on the spool 20, the brake elements 40 are rotated in a counterclockwise winding direction R which is opposite to a clockwise casting direction T, as can be readily seen from FIGS. 4 through 6. At this time, all the brake elements 40 are placed under the influence of a centripetal force, whereby a contact state between the brake elements 40 and the brake drum 60 is freed. The flange portion 33 is projectedly formed on the bottom surface of each sliding groove 31 at a position where the flange portion 33 can be engaged with the engagement protrusions 43 of the brake element 40 with a predetermined clearance.

By the above-described construction of the centrifugal braking device for a bait casting reel according to the present invention, when casting bait in the casting direction T with a weight connected to a fishline, it is possible to solve a backlash problem. In the conventional art, a force initially applied in the casting direction is greater than a rotation force of the spool 20 due to presence of the weight, but as the force applied in the casting direction is gradually decreased, the rotation force of the spool 20 becomes greater than the casting force, by which a backlash problem is caused, whereby the fishline is overly paid out and is likely to be entangled around the spool 20.

In the present invention, due to the fact that the brake elements 40, which are radially positioned with respect to the spool 20 and have the predetermined inclination angle, are brought into frictional contact with the brake drum 60 in the circumferential direction by the rotation force of the spool 20, the rotation force of the spool 20 can be reduced to some extent by a frictional force induced between the brake elements 40 and the brake drum 60. That is to say, in the present invention, since a centrifugal braking scheme is adopted, the backlash problem can be solved.

When it is necessary to adjust a braking force for braking the spool 20, which is generated due to the frictional contact between the brake elements 40 and the brake drum 60, in a state in which the cover 19 is decoupled from the reel body 10, the number of brake elements 40 which are to be brought into contact with the brake drum 60 can be properly and easily adjusted by sliding necessary brake shoes 40 with the knob portions 45 in the sliding grooves 31 inward or outward.

Referring to FIGS. 4 through 6, while six brake elements 40 are illustrated for simplicity of explanation, the present invention is not limited to this number of brake elements 40. For example, in order to increase the braking force of the spool 20, the knob portions 45 of symmetrically positioned brake elements 40 are pulled radially outward in the sliding grooves 31 of the brake housing 30. Then, the flange portions 33 formed on the bottom surfaces of the sliding grooves 31 are disengaged from the engagement protrusions 43 of the rectangular openings 41 which are defined in the brake elements 40, whereby the symmetrically positioned brake elements 40 can be freely brought into contact with the brake drum 60. As the symmetrically positioned brake elements 40 are brought into frictional contact with the inner surface of the brake drum 60, it is also possible to reduce noise generated by vibration, etc.

In FIG. 4, two contact regions between the brake elements 40 and the brake drum 60 are illustrated. In FIG. 5, four contact regions between the brake elements 40 and the brake drum 60 are illustrated. In FIG. 6, six contact regions between the brake elements 40 and the brake drum 60 are illustrated. Since every user applies a different level of casting force, if the same rotation-resistant force is set for every user, in the case of a user who can apply only a low level of casting force, a cast will be short. Therefore, in this situation, by sliding four brake elements 40 radially inward, only two contact regions exist between the brake elements 40 and the brake drum 60. By this fact, the flange portions 33 formed on the bottom surfaces of the sliding grooves 31 are engaged again with the engagement protrusions 43 of the rectangular openings 41 which are defined in the four brake elements 40 slidably moved inward. As a consequence, even in the case of the user who can apply a low level of casting force, a cast can be appropriately increased.

Of course, at this time, by bringing oppositely arranged brake elements 40 into contact with the brake drum 60, a frictional force induced by the brake drum 60 can be evenly distributed over the entire inner surface of the brake drum 60, whereby vibration can be effectively reduced around the rotation axis of the spool 20.

As apparent from the above description, the centrifugal braking device for a bait casting reel according to the present invention provides advantages in that, since an outer end surface of each brake element is inclined to substantially conform to a rounded contour of a circumferential inner surface of a brake drum, a contact efficiency between the brake element and the brake drum is improved, and the possibility that the brake element will not be brought into contact with the brake drum is eliminated.

Also, due to the fact that the brake elements are arranged to be positioned differently by a predetermined angle from one another, when implementing a fishline winding operation on a spool, the brake elements are rotated in a counterclockwise winding direction R which is opposite to a clockwise casting direction T. As a consequence, because the brake elements are placed under the influence of a centripetal force, a contact state between the brake elements and the brake drum is freed, whereby it is possible to reliably implement the fishline winding operation.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A centrifugal braking device for a bait casting reel, comprising:
    a spool having a spool shaft which is rotatably coupled to a reel body;
    a brake housing coupled to one end of the spool shaft to be rotated integrally with the spool and having a plurality of sliding grooves each of which extends radially;
    a plurality of brake elements slidably received in the sliding grooves of the brake housing, to be rotated integrally with the spool;
    a brake drum capable of being brought into frictional contact with the brake elements to selectively limit to some extent rotation of the brake housing due to a centrifugal force generated by rotation of the brake elements; and
    a cover coupled to the reel body to close one side of the reel body;
    wherein the brake elements are positioned differently from one another by a predetermined angle along a circumferential direction about a center of the brake housing and slidably received in the sliding grooves each of which extends radially,
    wherein a guide plate is coupled to the brake housing to be placed on the brake housing, and
    wherein a frictional force between outer end surfaces of the brake shoes and an inner surface of the brake drum is selectively increased or decreased depending upon a rotating direction of the brake elements.

2. The centrifugal braking device as set forth in claim 1, wherein a flange portion is projectedly formed on a bottom surface of each sliding groove-adjacent to an outer end of each sliding groove, and a pair of engagement protrusions are formed on a pair of inner edges of each brake element adjacent to an outer end of the brake element, which inner edges face each other and cooperate with another pair of inner edges of the brake element to define a rectangular opening through the brake element, in a manner such that the flange portion can be engaged with the pair of engagement protrusions to selectively limit rotation of the brake element to some extent.

3. The centrifugal braking device as set forth in claim 1, wherein a plurality of perforations are defined through the guide plate, in a manner such that a knob portion which is projectedly formed at an inner end of each brake element can be upwardly inserted through each perforation to be capable of being moved radially inward or outward in the sliding groove of the brake housing so then a contact area between the brake element and brake drum can be adjustable selectively.

4. The centrifugal braking device as set forth in claim 1, wherein each brake element is received in the sliding groove in a state in which it is parallel separated from a rotation axis of the brake housing to increase a contact area between the outer end surface of the brake element and the inner surface of the brake drum, and the outer end surface of the brake element is inclined at a predetermined inclination angle to maximize the contact area between the outer end surface of the brake element and the inner surface of the brake drum, in a manner such that a rotation-resistant force is controllably generated in response to a casting force when casting bait and no resistant force is generated in response to a winding force when winding a fishline.

5. The centrifugal braking device as set forth in claim 4, wherein the flange portion is projectedly formed on the bottom surface of each sliding groove at a position where the flange portion can be engaged with the engagement protrusions of the brake element with a predetermined clearance.

\* \* \* \* \*